C. L. ARMSTRONG.
FRICTION CLUTCH.
APPLICATION FILED MAR. 25, 1912.

1,051,854.

Patented Feb. 4, 1913.
2 SHEETS—SHEET 1.

WITNESSES:
Harry A. Beinnes
Jnomichef

INVENTOR.
Charles L. Armstrong
BY Emil Staren
ATTORNEY.

C. L. ARMSTRONG.
FRICTION CLUTCH.
APPLICATION FILED MAR. 25, 1912.
1,051,854.
Patented Feb. 4, 1913.
2 SHEETS—SHEET 2.
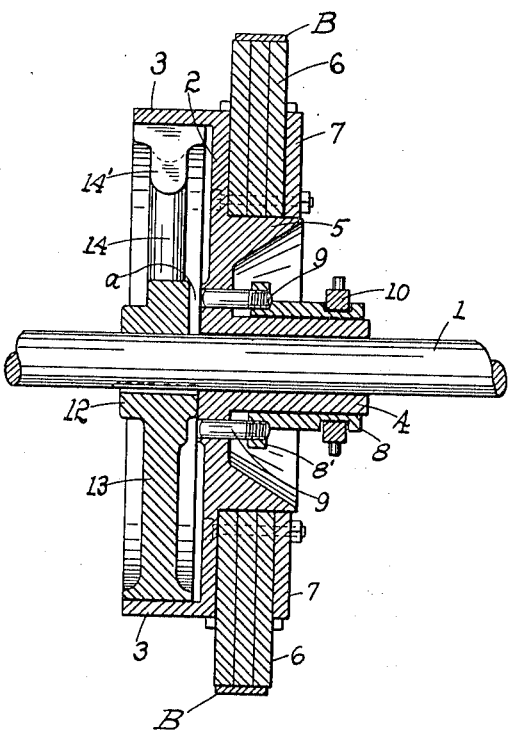
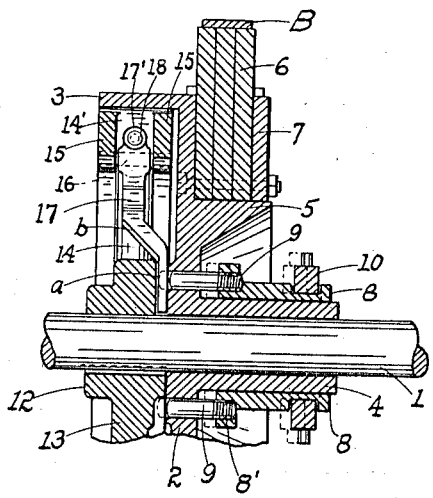
WITNESSES:
Harry A. Beinel.
Josamichel
INVENTOR.
Charles L. Armstrong.
BY
ATTORNEY.

UNITED STATES PATENT OFFICE.

CHARLES L. ARMSTRONG, OF WATERLOO, IOWA, ASSIGNOR TO ARMSTRONG MANUFACTURING COMPANY, OF WATERLOO, IOWA, A CORPORATION OF IOWA.

FRICTION-CLUTCH.

1,051,854.     Specification of Letters Patent.     Patented Feb. 4, 1913.

Application filed March 25, 1912. Serial No. 685,920.

*To all whom it may concern:*

Be it known that I, CHARLES L. ARMSTRONG, a citizen of the United States, residing at Waterloo, in the county of Blackhawk and State of Iowa, have invented certain new and useful Improvements in Friction-Clutches, of which the following is a full, clear, and exact description, reference being had to the accompanying drawings, forming a part hereof.

My invention has relation to improvements in friction clutches; and it consists in the novel details of construction more fully set forth in the specification and pointed out in the claims.

Figure 1:
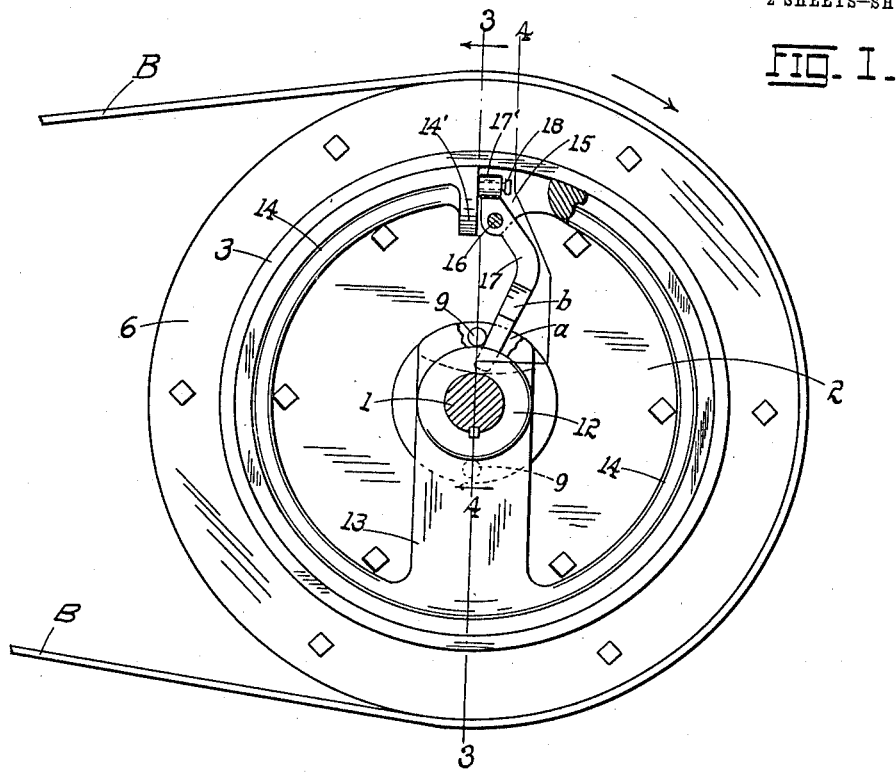
Figure 2:
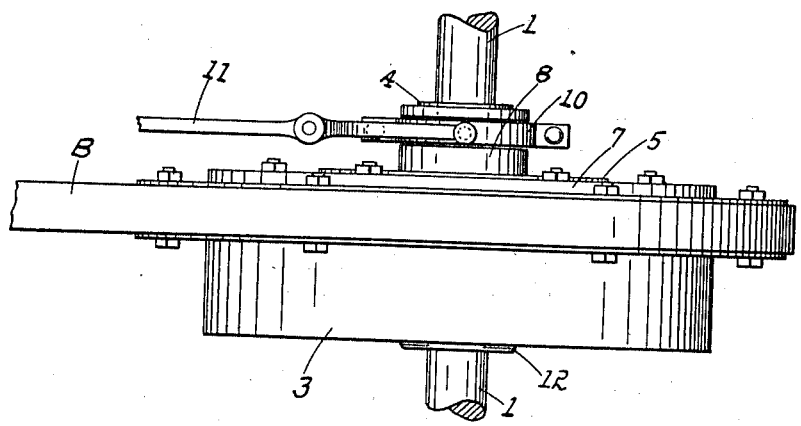

In the drawings, Figure 1 is a face elevation of the band-wheel and clutch mechanism, the drive-shaft being in cross-section; Fig. 2 is a top plan of the same; Fig. 3 is a vertical transverse section on the line 3—3 of Fig. 1; and Fig. 4 is a vertical sectional detail on the zig-zag line 4—4 of Fig. 1.

The present clutch though eminently adapted, and specifically designed for use in connection with well drilling machines, may be used with advantage on any class of machinery whatsoever.

The objects sought are to produce a clutch which will remain ineffective when the band-wheel with which it is identified, is reversed in order to reverse when necessary, the friction-driven hoisting drum forming one of the elements of a drilling machine; one which shall be simple, durable, efficient and absolutely reliable under all conditions; one which can be easily operated; one which is instantly responsive to the controlling lever by which the same is manipulated; one which eliminates all friction when the clutch is disengaged; one which permits the band-wheel to rotate continuously and the main shaft may be stopped or started instantly at the will of the operator; one which is noiseless; and one possessing further and other advantages better apparent from a detailed description of the invention which is as follows:

Referring to the drawings, 1 represents the main shaft (broken away) about which is loosely mounted the disk or rotatable member 2, the same having cast integrally therewith on one side, a peripheral flange 3, and on the opposite side a hub 4 engaging the shaft, and a flange 5 surrounding the hub, respectively. The flange 5 supports the wood layers 6 forming the center of the band-wheel, said wheel being driven by a belt B leading to any suitable source of power (not shown), the layers 6 being protected by an outer ring 7 passed over the flange 5, the several layers 6, and ring 7 being bolted to the disk 2. For convenience, the parts 2, 3, 4, 5, 6 and 7 may be regarded as the band-wheel proper, rotating as they do, as a unit, about the axis of the shaft 1. Sliding freely on the hub 4 to and from the disk 2, is a sleeve 8 the inner terminal flange 8' of which is provided with pins 9, 9, disposed one-hundred and eighty degrees apart, the pins playing freely through openings formed for their reception in the disk 2. The sliding movement referred to is imparted to the sleeve 8 through the medium of a loosely encompassing band or shifting ring 10 (made in two halves bolted together) deposited in a peripheral groove in the sleeve 8 and actuated by a control lever 11 as well understood in the art. Shifting means of this character are common and *per se* are not claimed herein. On the opposite side of the disk 2, and within the flange 3, there is keyed to the shaft 1 the terminal or hub 12 of a spoke 13 preferably forming an integral part of the split ring 14, the members or arms of which on each side of the spoke may be expanded to frictionally engage the inner face of the flange 3. The free end of one of the split-ring arms is provided with a pair of lugs or lobes 15, 15, which support the pivotal pin 16 about which is hinged the clutch-lever 17, the free end of the long arm of said lever playing in the space or clearance *a* between the hub 12 and disk 2 opposite one (or the other) of the pins 9. Since the lever 17 is suspended centrally within the ring 14, the long arm of the lever is provided with a lateral bend or offset *b* to bring the free end thereof into the clearance *a*. The short arm of the lever 17 terminates in a head 17' carrying an adjusting screw 18, said screw engaging the terminal enlargement or bearing 14' formed on the opposite member of the split ring 14.

The operation of the clutch is substantially as follows:—Rotation is imparted to the band-wheel through the belt B in the direction indicated by the arrow in Fig. 1. If it be desired to engage the clutch-ring 14 with the flange 3 of the band-wheel, the operator manipulates the controlling lever 11 in proper direction to cause the sleeve 8 to slide inwardly or toward the disk 2 (dotted position Fig. 4), in which movement the inner ends of the pins 9, 9, are brought into the plane of oscillation of the clutch-lever 17 causing one or the other of the pins (which obviously revolve with the band-wheel about the axis of the shaft 1) to engage and trip the lever 17, causing the short arm thereof to oscillate toward the bearing 14' of the opposing member of the split-ring 14, the head 17' of the lever-arm (previously set to proper adjustment by the screw 18) forcing the split-ring members or arms apart and into firm frictional engagement with the flange 3, whereupon the ring 14 is set into rotation in the same direction with the band-wheel. The clutch-ring being keyed to the drive shaft 1 naturally will rotate the shaft, from which in turn motion may be communicated to the machinery with which said shaft is identified.

It will be seen from the foregoing that a reverse rotation of the band-wheel will release the clutch-ring in the event the pins 9, 9, are accidentally shifted into the plane of oscillation of the clutch-lever, since an engagement of the lever by the pins under such circumstances will oscillate the lever in the opposite direction, so that the head 17' will swing away from the bearing 14', allowing the arms of the split-ring to spring away from the flange 3. This leaves the band-wheel free to turn without affecting the shaft 1, a feature which is of great advantage in well-drilling machines where it becomes necessary to reverse the band wheel for purposes of reversing the hoisting drum. It will be further observed that the only strain on the clutch-lever is that which results from the pressure necessary to effect the desired engagement between the clutch-ring and the band-wheel, no driving strain being impressed on the lever. Once the ring is expanded into contact with the flange 3 there is no slipping between the parts and hence there is no lost motion, and the greater the resistance or load imposed on the shaft 1 the greater the friction between the ring 14 and band-wheel, and vice-versa. Any sudden shock in the course of the engagement between the parts is eliminated as the clutch automatically adjusts itself to the load. Again, there can be no slipping between the parts as any tendency to slip will expand the clutch-ring. To stop the shaft, the operator swings the controlling lever 11 in proper direction to retract the pins 9, 9, out of the path of the lever 17, when the natural spring in the metal arms of the clutch-ring will cause the ring to clear the flange 3 of the band-wheel, leaving the latter free to rotate by itself without imparting rotation to the shaft. The clutch-ring may be considered to be composed of the central radial spoke 13, from which extend in opposite directions the resilient arms or members of the ring, said members or arms having an alternately closing and expanding or opening movement to effect the results here contemplated. The ends of these arms or members may be considered the ends of the ring. The spoke 13 need not necessarily be formed integral with the ring portion, but in practice it is preferred to have this member of one piece.

It is obvious that whether the shaft 1 be driven by the band-wheel (as described), or the band-wheel be driven by the shaft, the principle of operation of the clutch will in no wise be changed.

Having described my invention, I claim:

1. In combination with a member rotatable about a fixed axis, a split clutch-ring independent of said member, a lever pivoted to one end of the clutch ring and adapted to engage the opposite end, and means on the rotatable member for actuating said lever and forcing the ring into engagement with the rotatable member.

2. In combination with a shaft, a member mounted loosely about the shaft, a split clutch-ring secured to the shaft adjacent said member, an oscillating lever pivoted to one of the arms of the split-ring and having an arm engaging the opposite arm of the ring, and devices carried by the rotatable member and under the control of the operator for actuating the lever and forcing the arms of the clutch-ring into engagement with the rotatable member.

3. In combination with a shaft, a band-wheel mounted loosely on the shaft and provided with a peripheral flange, a split-ring secured to the shaft within the flange, a lever pivoted to one end of the split-ring and engaging the opposite end, and devices on the band-wheel adapted to be brought in the path of the lever for oscillating the latter with a given direction of rotation of the band-wheel and forcing the split-ring into frictional engagement with the flange of the band-wheel.

4. In combination with a shaft, a flanged band-wheel loosely mounted on, and free to rotate about, the shaft, a hub formed on the wheel around the shaft, a split-ring having a spoke keyed to the shaft within the flange of the band-wheel, a suitable clearance being formed between the spoke and wheel on one side of the axis of the shaft, a lever hinged to the free end of one of the members of the split-ring and having a short arm engaging the free end of the opposite member, the long arm of the lever operating in the clearance aforesaid, an adjusting screw on the short arm of the lever, a sleeve mounted to slide on the hub of the band-wheel, pins carried by the sleeve and playing freely through the band-wheel, and positioned to engage the long arm of the lever with an inward movement of the sleeve and oscillate the lever to cause the short arm thereof to spread the members of the split-ring apart and force the same into frictional contact with the flange of the band-wheel, with a rotation of the latter in a given direction.

5. In combination with a shaft, a wheel mounted loosely about the shaft and free to rotate independently thereof, a split ring comprising a pair of arms and having a radially disposed spoke keyed to the shaft, the wheel being provided with a formation adapted to be engaged by the members or arms of the split-ring, a sliding piece on the wheel moving parallel to the axis of the shaft, a lever pivoted at one end of the split-ring and having a short lever-arm engaging the opposite end, and means for bringing the sliding piece in the path of the lever for tripping the latter and causing an expansion of the split-ring against the formation aforesaid, with a rotation of the wheel in a given direction.

6. In combination with a rotatable member, a friction-clutch member engaging said rotatable member with a rotation of the latter in a given direction, an oscillating lever pivoted to the clutch member and controlling the latter, and means on the rotatable member for actuating the lever and effecting a disengagement between said members with a rotation of the rotatable member in the opposite direction.

In testimony whereof I affix my signature, in presence of two witnesses.

CHARLES L. ARMSTRONG.

Witnesses:
H. B. EDWARDS,
A. A. SOHNER, Jr.